(No Model.)
M. J. GESSNER.
STRAW CARRIER FOR THRASHING MACHINES.
No. 297,594. Patented Apr. 29, 1884.
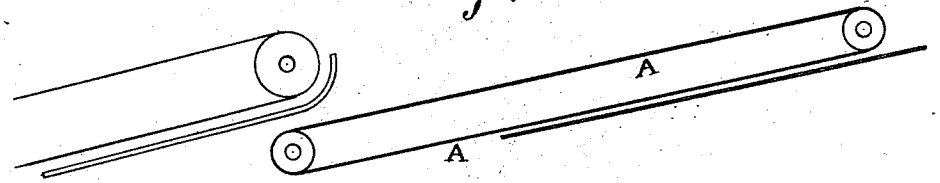
Fig. 1
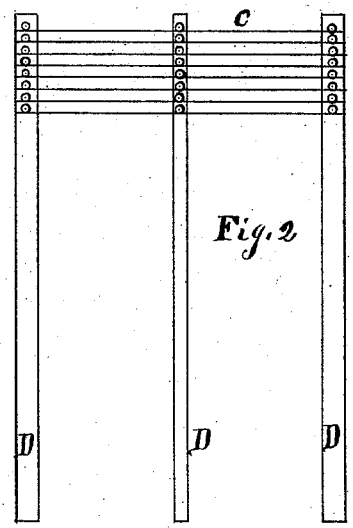
Fig. 2
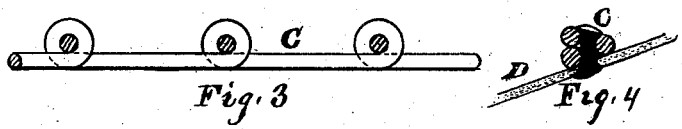 
Fig. 3  Fig. 4
Witnesses,
Chr. E. Gerlach
C. Winstanley
Inventor.
Maximillion J. Gessner
per J. L. Pierce
his Attorney

UNITED STATES PATENT OFFICE.

MAXIMILLION J. GESSNER, OF SAN FRANCISCO, CALIFORNIA.

STRAW-CARRIER FOR THRASHING-MACHINES.

SPECIFICATION forming part of Letters Patent No. 297,594, dated April 29, 1884.

Application filed January 9, 1884. (No model.)

*To all whom it may concern:*

Be it known that I, MAXIMILLION J. GESSNER, a citizen of the United States, residing in the city and county of San Francisco, and State of California, have invented a new and useful Straw-Carrier for Thrashing-Machines, of which the following is a specification.

The object of my invention is to produce a straw-carrier obstructed as little as possible by the bars or slats passing across and fastened to the belts forming a part of it. How this is accomplished is shown in the accompanying drawings, in which—

Figure 1 is a partial elevation of a grain and straw carrier of a thrashing-machine; Fig. 2, a plan of same, showing a few of the wire bars and the belts to which they are attached; and Figs. 3 and 4, enlarged views of the wire bars.

By the old construction with wooden slats it is well known that the straw carried over considerable grain, which was lost by being buried in the straw. This I prevent by using instead of flat and wide slats bars of wire, which not only increase the openings in the carrier, but, being round, no grain will rest or be transported on them.

A, Fig. 1, is a straw-carrier, the construction of which is shown in Figs. 2, 3, and 4, where B are the flexible endless belts, and C are some of the wire bars. These bars are twisted into loops at or near the ends. These loops or eyes are for the purpose of riveting them to the belts, as shown in Figs. 3 and 4. By this construction it will be seen that I can make a strong, open, and flexible straw-carrier.

Having thus illustrated and described my invention, what I claim as new, and desire to secure by Letters Patent, is—

The combination, in a straw-carrier, of two or more flexible endless belts, the cross-bars formed of round metallic rods or wires bent to form loops or eyes, and rivets for securing said rods to said belts, substantially as and for the purpose described.

MAXIMILLION J. GESSNER.

Witnesses:
G. L. PIERCE,
CHAS. D. WHEAT.